United States Patent

Ishii et al.

[11] Patent Number: 6,152,037
[45] Date of Patent: Nov. 28, 2000

[54] METHOD OF LITHOGRAPHIC PRINTING

[75] Inventors: Kazuo Ishii; Sadao Osawa; Yusuke Nakazawa; Eiichi Kato, all of Shizuoka, Japan

[73] Assignee: Fuji Photo Film Co., Ltd., Kanagawa, Japan

[21] Appl. No.: 09/268,116

[22] Filed: Mar. 15, 1999

[30] Foreign Application Priority Data

Mar. 18, 1998 [JP] Japan .................................. 10-089493

[51] Int. Cl.⁷ ....................................................... B41C 1/10
[52] U.S. Cl. ............................................. 101/466; 430/49
[58] Field of Search ................................ 101/462, 463.1, 101/465, 466, 467; 430/49, 302; 347/55

[56] References Cited

U.S. PATENT DOCUMENTS

| | | | |
|---|---|---|---|
| 5,582,106 | 12/1996 | Kanda et al. | 101/462 |
| 5,607,533 | 3/1997 | Kato | 101/467 |
| 5,726,693 | 3/1998 | Sharma et al. | 347/55 |
| 5,852,453 | 12/1998 | Hirahara et al. | 347/55 |
| 5,852,975 | 12/1998 | Miyabe et al. | 101/463.1 |
| 5,975,684 | 11/1999 | Suetsugu et al. | 347/55 |
| 6,019,045 | 2/2000 | Kato et al. | 101/466 |

*Primary Examiner*—Stephen R. Funk
*Attorney, Agent, or Firm*—Reed Smith Shaw & McClay LLP

[57] ABSTRACT

A method of lithographic printing comprising forming an image based on signals of image data directly on a printing plate precursor mounted on a plate cylinder of a printing press, thereby preparing a printing plate, and conducting lithographic printing, wherein the formation of image on the printing plate precursor is carried out by an ink jet recording method in which oil-based ink is ejected utilizing an electrostatic field. According to the method of the present invention, a large number of prints having clear images can be obtained. Further, a printing plate is directly formed corresponding to digital image data in a printing press, and lithographic printing is performed at a low cost and a high speed.

11 Claims, 2 Drawing Sheets

METHOD OF LITHOGRAPHIC PRINTING

FIELD OF THE INVENTION

The present invention relates to a method of lithographic printing in which digital plate-making is performed in a printing press. More particularly, the present invention relates to a method of lithographic printing in which oil-based ink is employed for plate-making and which provides images having an excellent image quality both on a lithographic printing plate and on prints.

BACKGROUND OF THE INVENTION

In the field of lithographic printing, ink receptive areas and ink repellent areas are formed on the surface of a printing plate in accordance with an original image, and printing ink adheres to the ink receptive areas to conduct printing. Ordinarily, hydrophilic areas and oleophilic (ink repellent) areas are imagewise formed on the surface of a printing plate, and the hydrophilic areas are rendered to ink repellent by applying dampening water thereto.

In a conventional manner, image formation on a printing plate (plate-making) is carried out by outputting an original image to a silver halide photographic film in an analog or digital manner, exposing a photosensitive material (printing plate precursor) containing a diazo resin or a photopolymerizable polymer through the silver halide photographic film, and removing by dissolving out the non-image areas mainly using an alkaline solution.

Recently, various methods wherein digital image information is directly recorded to a printing plate precursor have been proposed in the field of lithographic printing with the improvement in a digital recording technology and the requirement for performing more efficiently a printing process. These methods include technologies referred to as a CTP (computer-to-plate) method and a DDPP (digital direct printing plate) method. For instance, an image recording system by photon mode or heat mode using a laser beam is known for plate-making and partially utilized in practice.

However, such a plate-making method usually includes treatment with an alkaline developer for removing by dissolving out the non-image areas after the image recording by photon mode or heat mode using a laser beam and thus, is accompanied with discharge of alkaline waste liquor which is undesirable in view of environmental conservation.

In order to perform more efficiently the printing process, a system in which the image recording is conducted in a printing press is also known. However, an expensive and huge apparatus is necessary in case of using the laser beam as described above. Therefore, a system utilizing an ink jet recording method using an inexpensive and compact recording device has been attempted.

A printing method wherein a plate drum having a hydrophilic or oleophilic surface is installed in a printing press instead of a conventional plate cylinder, oleophilic or hydrophilic images are formed on the plate drum by means of an ink jet recording method, and after lithographic printing operation the images are removed to clean the plate drum is described in JP-A-4-97848 (the term "JP-A" as used herein means an "unexamined published Japanese patent application"). The printing method, however, has a problem in that printing durability of the plate drum is inconsistent with the removal of images from the plate drum after the printing operation (i.e., easiness of the clearing). Further, since a resin solution is employed as ink in the ink jet recording method for forming the images on the plate drum, the resin tends to deposit in a nozzle due to evaporation of the solvent and so that ejection of ink becomes unstable. Therefore, it is difficult to obtain images of good qualities.

In U.S. Pat. No. 4,833,486, a method of preparing a lithographic plate by an ink jet recording method using solid ink which is melted in an ink jet print head is described. However, such a method is inconvenient, since the solid ink has to be melted prior to the ink discharge and a sufficient time is required for warm-up of an ink jet recording apparatus.

SUMMARY OF THE INVENTION

The present invention has been made in order to overcome the problems as described above.

Specifically, an object of the present invention is to provide a method of lithographic printing which responds to a digital recording system and in which development processing is disused for forming a printing plate.

Another object of the present invention is to provide a method of lithographic printing which is capable of providing a large number of prints having clear images in a simple manner using no expensive apparatus.

Other objects of the present invention will become apparent from the following description.

It has been found that these objects of the present invention are accomplished by a method of lithographic printing comprising forming an image based on signals of image data directly on a printing plate precursor mounted on a plate cylinder of a printing press, thereby preparing a printing plate, and conducting lithographic printing, wherein the formation of image on the printing plate precursor is carried out by an ink jet recording method in which oil-based ink is ejected utilizing an electrostatic field.

| | Explanation of the Symbols: |
|---|---|
| 1 | Lithographic printing press forming lithographic printing plate therein |
| 11 | Plate cylinder |
| 12 | Blanket cylinder |
| 13 | Impression cylinder |
| 2 | Ink jet recording device |
| 21 | Arithmetic and control unit of image data |
| 3 | Dampening water supplying device |
| 4 | Printing ink supplying device |
| 5 | Fixing device |
| 6 | Plate surface desensitizing device |
| 7 | Automatic plate supplying device |
| 8 | Automatic plate discharging device |
| 9 | Plate (Printing plate precursor) |
| 22 | Ejection head |
| 221 | Upper unit of ejection head |

-continued

Explanation of the Symbols:

| | |
|---|---|
| 222 | Lower unit of ejection head |
| 22a | Ejection slit |
| 22b | Ejection electrode |
| 23 | Oil-based ink |
| P | Printing paper |

DETAILED DESCRIPTION OF THE INVENTION

The present invention is characterized in that the formation of image is carried out by an ink jet recording method in which oil-based ink is ejected utilizing an electrostatic field on a plate (printing plate precursor) mounted on a plate cylinder of a printing press. Specifically, voltage is applied in accordance with digital image signals to an ejection electrode provided in an ink ejection head and the oil-based ink is ejected utilizing an electrostatic field formed between the ejection electrode and the printing plate precursor electrically grounded. The ink jet recording method in which oil-based ink is ejected utilizing an electrostatic field is known as described in W93/11866, WO95/32864 and WO97/27056, and also referred to as an electrostatic ink jet recording method or an electrostatically attracting ink jet recording method sometimes.

In the method of the present invention, a size of ink droplet ejected from an ejection head of an ink jet recording device is determined by a size of an ejection electrode. Specifically, when a small-size ejection electrode is used, minute ink droplets can be formed without decreasing a width of an ejection slit. Thus, control of fine images can be effected without the occurrence of clogging in the ejection slit. The method of lithographic printing according to the present invention is, therefore, able to provide a large number of prints having clear images.

The present invention also includes the following embodiment.

(1) a method of lithographic printing as described above, wherein the oil-based ink is a dispersion comprising hydrophobic resin particles which are solid at least at ordinary temperature dispersed in a nonaquaous solvent having an electric resistance of $10^9$ Ωcm or more and a dielectric constant of 3.5 or less.

Now, the method of the present invention will be described in more detail below.

One example of a lithographic printing press capable of forming lithographic printing plates therein which can be employed for performing the method of lithographic printing according to the present invention is described with reference to the accompanying drawings.

Figure 1:
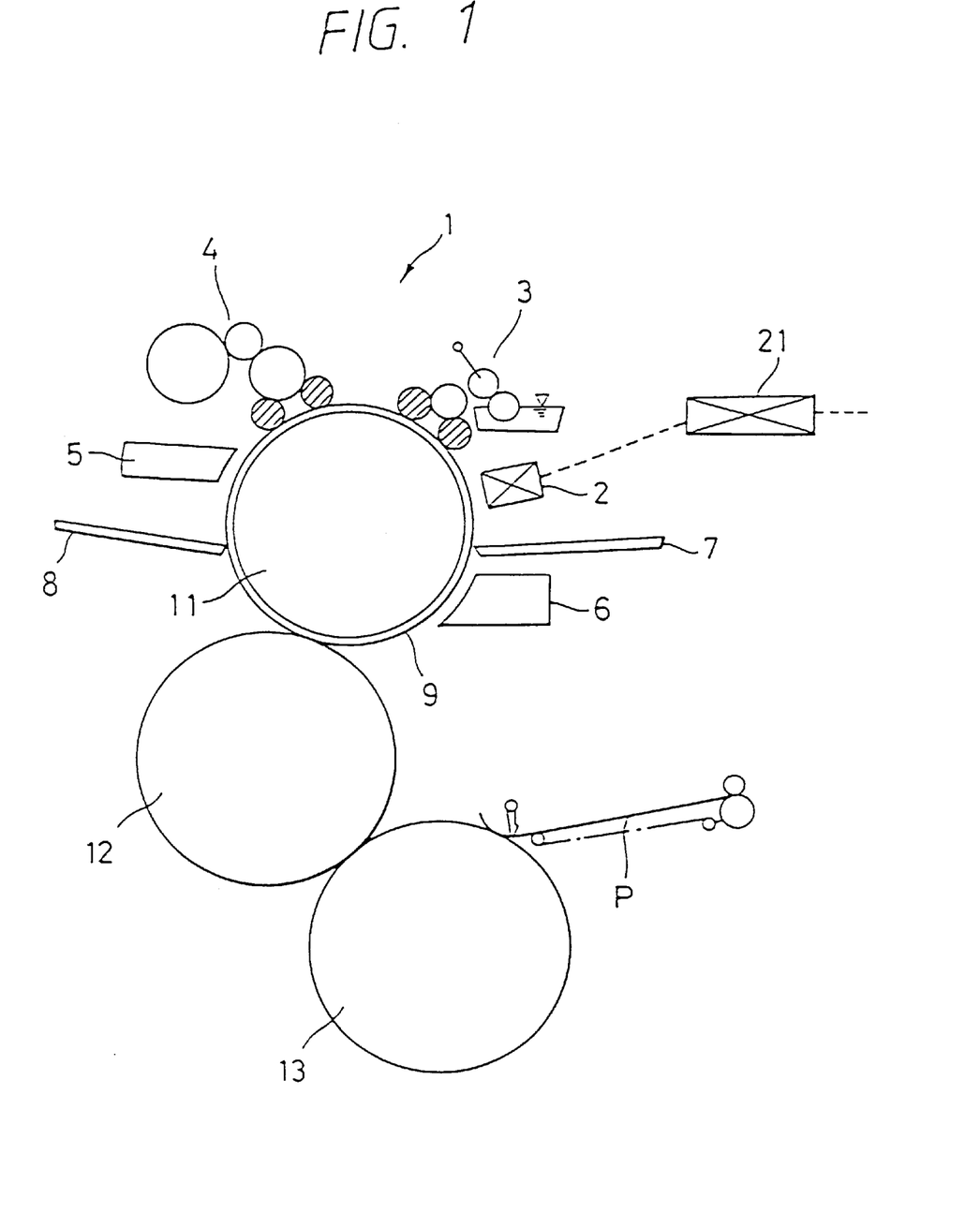
FIG. 1 is a side view showing one embodiment of a lithographic printing press forming a lithographic printing plate therein which can be used to perform the method of the present invention.
Figure 2:
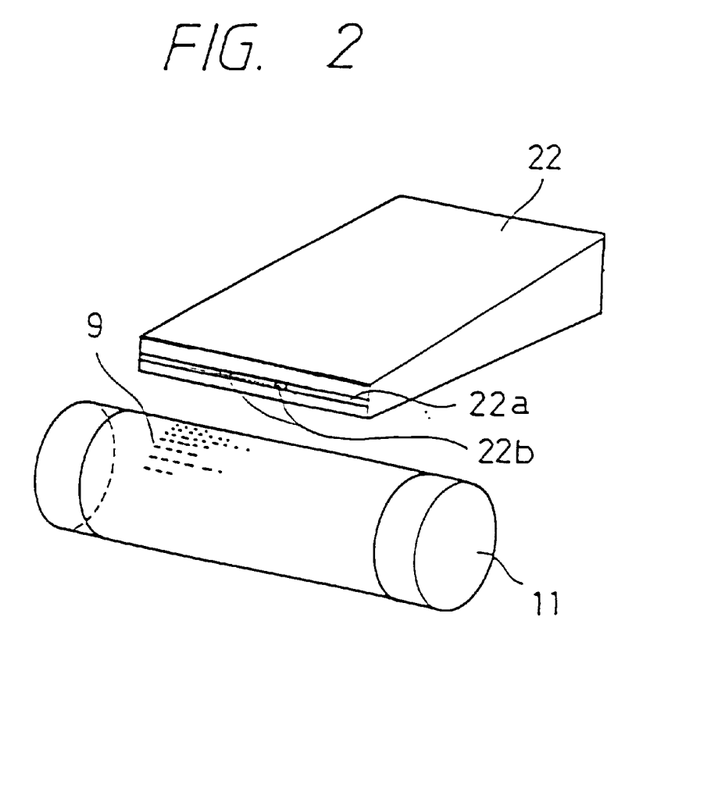
FIG. 2 is a perspective view showing the main part of an ink jet recording device which can be used in the method of the present invention.
Figure 3:
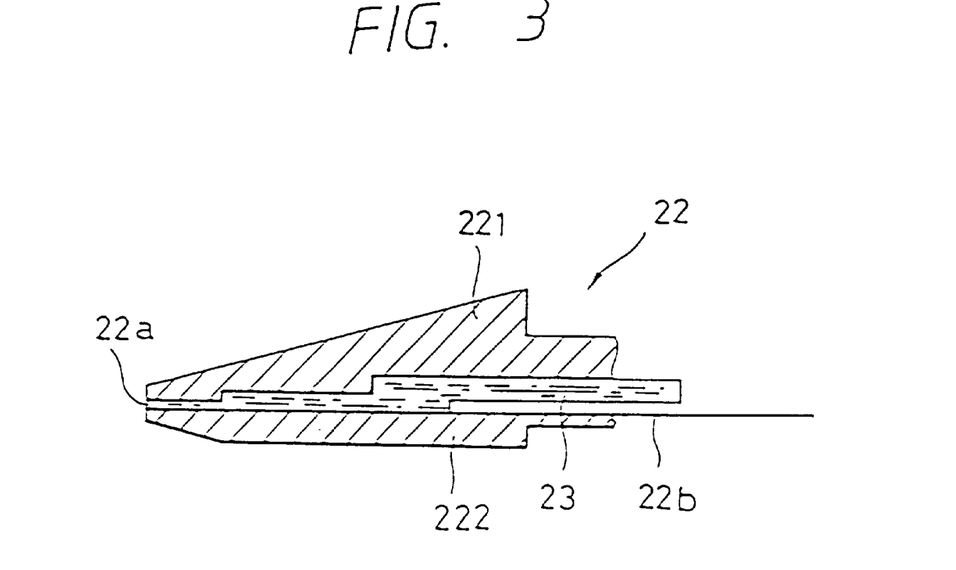
FIG. 3 is a fragmentary vertical sectional view showing a head of an ink jet recording device which can be used in the method of the present invention.

The whole construction of lithographic printing press capable of forming lithographic printing plates therein is shown in FIG. 1. FIG. 2 and FIG. 3 are drawings for explaining an ink jet recording device installed in the lithographic printing press capable of forming lithographic printing plates therein of FIG. 1. Specifically, FIG. 2 is a perspective view showing the main part of such an ink jet recording device, and FIG. 3 is a fragmentary vertical sectional view showing an ejection head of such an ink jet recording device.

Referring to FIG. 1, the lithographic printing press capable of forming lithographic printing plates therein (also simply referred to as printing press, sometimes hereinafter) 1 includes a plate cylinder 11, a blanket cylinder 12 and a impression cylinder 13. The blanket cylinder 12 for transferring printing ink images is arranged so as to contact with the plate cylinder 11 and press against, and the impression cylinder 13 for transferring the printing ink images to printing paper P is arranged so as to contact and press against the blanket cylinder 12.

The printing press 1 also includes an ink jet recording device 2. The ink jet recording device 2 ejects oil-based ink on a plate 9 mounted on the plate cylinder 11 corresponding to image data provided from an arithmetic and control unit of image data 21 to form images.

The printing press 1 further includes a dampening water supplying device 3 for supplying dampening water to hydrophilic areas (non-image areas) of a printing plate. Moreover, the printing press 1 includes a printing ink supplying device 4, a fixing device 5 for firmly adhering the images of oil-based ink on the plate 9 by heating, and a plate surface desensitizing device 6 which may be used for the purpose of increasing hydrophilicity of the non-image areas of the printing plate, if desired.

The printing press 1 may further include an automatic plate supplying device 7 for automatically supplying the plate (printing plate precursor) 9 onto the plate cylinder 11 and an automatic plate discharging device 8 for automatically discharging the printing plate after the completion of lithographic printing process. Using these devices 7 and 8, the printing operation can be carried out in a easier manner and for a shorter period of time and thus, the objects of the present invention are more effectively achieved.

An arithmetic and control unit of image data 21 acts to receive image data from an image scanner, a magnetic disc device, an image data communication device or the like, and to conduct color separation and divisional arithmetic of the separated data into appropriate picture element number and gradation number. Specifically, the image data separated to each color are manipulated arithmetically so as to express in the picture element number of 16 or more per 1 $mm^2$ and to express in the gradation number of 64 or more per picture element.

The arithmetic and control unit also conducts arithmetic of dot area rate in order to form dot images by means of an ink ejection head 22 (described in more detail with reference to FIG. 2 and FIG. 3 hereinafter) installed in the ink jet recording device 2 using oil-based ink.

Further, the arithmetic and control unit of image data 21 controls not only action timing of the plate cylinder 11, blanket cylinder 12, impression cylinder 13 or the like but also movement of the ink ejection head 22 and ejection timing of oil-based ink.

A process for the preparation of a lithographic printing plate is described with reference to the printing press shown in FIG. 1 below.

A plate 9 is affixed on the plate cylinder 11 by means of the automatic plate supplying device 7. Image data is provided from a magnetic disc device to the arithmetic and control unit of image data 21. The arithmetic and control unit of image data 21 performs color separation depending on the input image data, and with each of the separated data, arithmetic of ejection position of oil-based ink and dot area rate in its position are carried out. These arithmetic data were once stored in buffers. The arithmetic and control unit of image data 21 acts to rotate the plate cylinder 11 and to move the ink ejection head 22 along the plate cylinder 11. During the movement of the ink ejection head 22, oil-based ink is ejected on the plate 9 mounted on the plate cylinder 11 in the ejection position and dot area rate obtained by the above described arithmetic. Consequently, dot images depending on a shade of the printing original are formed. The action continues while the plate cylinder 11 makes one revolution and thus images of oil-based ink corresponding to one color of the printing original are formed on the plate 9, to produce a printing plate. Then, the ink jet recording device 2 is moved to a position away from the plate cylinder 11 in order to protect the ink ejection head 22.

The oil-based ink images thus-formed are strengthened, for example, with heating by means of the fixing device 5, if desired.

Printing steps after the preparation of printing plate are same as in a conventionally known lithographic printing method. Specifically, printing ink and dampening water are supplied onto the plate 9 having the oil-based ink images thereon to form printing ink images, the printing ink images are transferred onto the blanket cylinder 12 which is rotating together with the plate cylinder 11, and then the printing ink images on the blanket cylinder 12 are transferred onto printing paper P passing through between the blanket cylinder 12 and the impression cylinder 13, thereby completing printing of one color. After the printing operation, the plate 9 is removed from the plate cylinder 11 by means of the automatic plate discharging device 8. In case of multicolor printing, printing of other color(s) are performed in the same manner.

In the printing press shown in FIG. 1, the plate cylinder 11 is preferably made of metal. In order to increase the anti-abrasion property, the surface of plate cylinder may be plated, for example, with chromium. The plate cylinder 11 is preferably grounded since it acts as a counter electrode to an ejection electrode at the ejection of oil-based ink utilizing an electrostatic field.

The automatic plate supplying device 7 and automatic plate discharging device 8 are known as subsidiary devices of a printing press. Examples of printing press equipped with such devices include Hamada VS34A (manufactured by Hamada Insatsu Kikai K.K.) and Toko 8000A (manufactured by Tokyo Kouku Keiki K.K.).

The image formation with the ink jet recording device 2 can be performed by any type including, for example, a serial type wherein an ink ejection head moves parallel to the axis of the plate cylinder 11 and ejects ink during the rotation of plate cylinder 11 and a line type using an ink ejection head having the same width as that of the plate cylinder 11.

Now, FIG. 2 and FIG. 3 will be explained in more detail below.

As shown in FIG. 2 and FIG. 3, the ejection head 22 contained within the ink jet recording device has a slit provided between an upper unit 221 and a lower unit 222, and a leading edge thereof forms an ejection slit 22a. Further, an ejection electrode 22b is arranged in the slit, and the interior of the slit is filled with oil-based ink 23.

To the ejection electrode 22b of the head 22, voltage is applied in accordance with digital signals from the pattern information of image. As shown in FIG. 2, the plate cylinder 11 is arranged as a counter electrode so as to face with the ejection electrode 22b, and a plate (printing plate precursor) 9 is mounted on the plate cylinder 11 acting as the counter electrode. By the application of the voltage, a circuit is formed between the ejection electrode 22b and the plate cylinder 11 acting as the counter electrode, and the oil-based ink 23 is ejected from the ejection slit 22a of the head 22, thereby forming images on the plate (printing plate precursor) 9 mounted on the plate cylinder 11 acting as the counter electrode.

With respect to the width of the ejection electrode 22b, it is preferred for the leading edge thereof to be as small as possible in order to form images of high quality. Although the specific value may be varied depending on the voltage applied, the distance between the electrodes or the like, the width of the leading edge thereof is ordinarily in a range of from 5 to 100 $\mu$m.

For instance, print of 40 $\mu$m-dot can be formed on the plate (printing plate precursor) 9 by filling the head 22 as shown in FIG. 3 with the oil-based ink, disposing the ejection electrode 22b with a leading edge having a width of 20 $\mu$m at a distance of 1.0 mm from the plate cylinder 11 acting as the counter electrode, and applying voltage of 3 kV for 0.1 millisecond between these two electrodes.

Now, the plate (printing plate precursor) which can be used in the present invention will be described in greater detail below.

A metal plate such as an aluminum plate or a steel plate plated with chromium is usually employed as the plate. An aluminum plate subjected to graining and anodizing treatment is particularly preferred because of excellent water-retention and anti-abrasion properties of the surface thereof. Also, a plate comprising a water-resistant support such as paper subjected to water-resistant treatment, a plastic film or paper laminated with plastic, having provided thereon an image-receiving layer is employed from an economic standpoint. A thickness of the image-receiving layer is ordinarily in a range of from 5 to 30 $\mu$m.

The image-receiving layer includes a hydrophilic layer comprising an inorganic pigment and a binder and a layer capable of being rendered hydrophilic upon an oil-desensitizing treatment.

The inorganic pigment used in the hydrophilic image-receiving layer includes clay, silica, calcium carbonate, zinc oxide, aluminum oxide and barium sulfate. The binder used includes a hydrophilic binder, for example, polyvinyl alcohol, starch, carboxymethyl cellulose, hydroxyethyl cellulose, casein, gelatin, a salt of polyacrylic acid, polyvinyl pyrrolidone and a methyl ether-maleic anhydride copolymer. Further, in order to impart water-resistance to the image-receiving layer, a melamine formaldehyde resin, a urea formaldehyde resin or other crosslinking agents may be added thereto, if desired.

A weight ratio of inorganic pigment/binder is preferably from 30/70 to 80/20.

The image-receiving layer to which an oil-desensitizing treatment is applied includes, for example, a layer comprising zinc oxide and a hydrophobic binder.

The zinc oxide used in the image-receiving layer according to the present invention is any of zinc oxide, zinc white, wet-type zinc white, and activated zinc white as commercially available, as described in "Shinban Ganryo Binran (New Edition of Pigment Handbook)", Nippon Ganryo Gijutsu Kyokai, ed., pp. 319, Kabushiki Kaisha Seibundo (1968).

Specifically, depending on starting materials and production methods, zinc oxide is classified into two groups, that produced by a wet method and that produced by a dry method which are further subclassified into zinc oxide produced by French method (indirect method) and that produced by American method (direct method).

Suitable examples of zinc oxide are those commercially available from Seido Kagaku Kogyo K.K., Sakai Chemical Industry Co., Ltd., Hakusui Chemical Industries, Ltd., Honjo Chemical K.K., Toho Zinc Co., Ltd., and Mitsui Mining & Smelting Co., Ltd.

A resin suitable for the hydrophobic binder includes a styrene copolymer, a methacrylate copolymer, an acrylate copolymer, a vinyl acetate copolymer, polyvinyl butyral, an alkid resin, an epoxy resin, an epoxy ester resin, a polyester resin and a polyurethane resin. The resins may be employed individually or as a mixture of two or more thereof.

A content of the resin in the image-receiving layer is from 9/91 to 20/80 in terms of a weight ratio of resin/zinc oxide.

The oil-desensitizing treatment of the image-receiving layer containing zinc oxide is conducted using an oil-desensitizing solution in a conventional manner. Suitable examples of the oil-desensitizing solution include those conventionally known, or example, a treating solution containing a cyan compound such as ferrocyanate or ferricyanate as the main component, a cyan-free treating solution containing an ammine cobalt complex, phytic acid or a derivative thereof, or a guanidine derivative as the main component, a treating solution containing an inorganic or organic acid capable of forming a chelate with an zinc ion as the main component, and a treating solution containing a water-soluble polymer.

For instance, the treating solutions containing a cyan compound include those described, e.g., in JP-B-44-9045 (the term "JP-B" as used herein means an "examined Japanese patent publication"), JP-B-46-39403, JP-A-52-76101, JP-A-57-107889 and JP-A-54-117201.

Now, the oil-based ink which can be used in the present invention is described in more detail below.

The oil-based ink used in the present invention is a dispersion comprising hydrophobic resin particles which are solid at least at ordinary temperature (i.e., 15° C. to 35° C.) dispersed in a nonaqueous solvent, preferably having an electric resistance of $10^9$ Ωcm or more and a dielectric constant of 3.5 or below. By using such a nonaqueous solvent as a dispersing medium, the electric resistance of the oil-based ink can be controlled appropriately. As a result, the ejection of ink by the action of an electrostatic field can be properly carried out, whereby the image quality is more improved.

Preferred examples of the nonaqueous solvent having an electric resistance of $10^9$ Ωcm or more and a dielectric constant of 3.5 or below include straight chain or branched aliphatic hydrocarbons, alicyclic hydrocarbons, aromatic hydrocarbons and halogenated products of these hydrocarbons. Specific examples thereof include hexane, heptane, octane, isooccane, decane, isodecane, decaline, nonane, dodecane, isododecane, cyclohexane, cyclooctane, cyclodecane, benzene, toluene, xylene, mesitylene, Isopar C,. Isopar E, Isopar G, Isopar H and Isopar L (Isopar: trade name, product of Exxon Corp.), Shellsol 70 and Shellsol 71 (Shellsol: trade name, product of Shell Oil Corp.), Amsco OMS and Amsco 460 solvent (Amusco: trade name, product of American Mineral Spirits Corp.), and silicone oils. They can be used individually or as a mixture of two or more thereof. As to the nonaqueous solvent, the upper limit of the electric resistance value is of the order of $10^{16}$ Ωcm, and the lower limit of the dielectric constant value is about 1.9.

When the electric resistance of the nonaqueous solvent used is too low beyond the foregoing range, the resulting ink cannot have an appropriate electric resistance, so that the ejection of ink by the action of an electrostatic field becomes poor. On the other hand, when the dielectric constant of the nonaqueous solvent used is too high beyond the foregoing range, the electrostatic field is apt to be relaxed due to polarization of the solvent, and thereby poor ejection of the ink tends to occur.

The resin particles dispersed in the nonaqueous solvent as described above are hydrophobic resin particles which are solid at temperature of 35° C. or below and have good affinity with the nonaqueous solvent. As such a hydrophobic resin, a resin (P) having a glass transition temperature of from −5° C. to 110° C. or a softening temperature of from 33° C. to 140° C. is preferred. The more preferable range of the glass transition temperature is from 10° C. to 100° C. and that of the softening temperature is from 38° C. to 120° C. In particular, it is preferred for the resin (P) to have a glass transition temperature of from 15° C. to 80° C. or a softening temperature of from 38° C. to 100° C.

By using a resin having such a glass transition temperature or a softening temperature as described above, the affinity of each resin particle with the surface of the printing plate precursor is enhanced and the resin particles are firmly bonded with each other on the printing plate precursor. Thus, the adhesion of the ink image to the printing plate precursor is increased and the press life is improved. On the contrary, if the glass transition temperature or a softening temperature of the resin used is beyond the upper and lower limits specified above, the affinity of each resin particle with the surface of the printing plate precursor may be lowered and the bond between resin particles may be weakened.

The weight average molecular weight (Mw) of the resin (P) is preferably from $1\times10^3$ to $1\times10^6$, more preferably from $5\times10^3$ to $8\times10^5$, and yet more preferably from $1\times10^4$ to $5\times10^5$.

Examples of such a resin (P) include olefin homopolymers and copolymers (such as polyethylene, polypropylene, polyisobutylene, ethylene-vinyl acetate copolymer, ethylene-acrylate copolymer, ethylene-methacrylate copolymer and ethylene-methacrylic acid copolymer), vinyl chloride homopolymers or copolymers (such as polyvinyl chloride and vinyl chloride-vinyl acetate copolymer), vinylidene chloride copolymers, vinyl alkanoate homopolymers and copolymers, allyl alkanoate homopolymers and copolymers, homopolymers and copolymers of styrene and derivatives thereof (such as butadiene-styrene copolymer, isoprene-styrene copolymer, styrene-methacrylate copolymer and styrene-acrylate copolymer), acrylonitrile copolymers, methacrylonitrile copolymers, alkyl vinyl ether copolymers, acrylate homopolymers and copolymers, methacrylate homopolymers and copolymers, itaconic acid diester homopolymers and copolymers, maleic anhydride copolymers, acrylamide copolymers, methacrylamide copolymers, phenol resins, alkyd resins, polycarbonate resins, ketone resins, polyester resins, silicone resins, amide resins, hydroxyl and carboxyl-modified polyester resins, butyral resins, polyvinyl acetal resins, urethane resins, rosin resins, hydrogenated rosin resins, petroleum resins, hydrogenated petroleum resins, maleic acid resins, terpene resins, hydrogenated terpene resins, chroman-indene resins, cyclized rubber-methacrylate copolymers, cyclized rubber-acrylate copolymers, copolymers containing a heterocyclic ring containing no nitrogen atom (as the heterocyclic ring, e.g., furan ring, tetrahydrofuran ring, thiophene ring, dioxane ring, dioxofuran ring, lactone ring, benzofuran ring, benzothiophene ring and 1,3-dioxetane ring), and epoxy resins.

It is desirable for the resin particles to be contained in the oil-based ink in an amount of from 0.5 to 20% by weight based on the total ink. When the amount of the resin particles is lower 'than 0.5% by weight, it becomes hard for the ink to have an affinity with the printing plate precursor and as a result, the ink may not form images of good quality and the press life tends to decrease. When the proportion of the resin particles is increased beyond the foregoing range, on the other hand, it is difficult to form a homogeneous dispersion and as a result, the ink is apt to clog an ejection head and stable ink ejection may not be achieved.

For the oil-based ink used in the present invention, it is preferred to contain a coloring material, as a colored component, together with the resin particles in order to easily conduct visual inspection of the resulting printing plate after the plate-making, or the like.

Such a coloring material may be any of pigments and dyes which have been ordinarily used in conventional oil-based ink compositions and liquid developers for electrostatic photography.

The pigments used have no particular restriction, and include both inorganic and organic pigments which are ordinarily used in the field of printing. Examples of pigment usable in the oil-based ink include carbon black, cadmium red, molybdenum red, chrome yellow, cadmium yellow, titanium yellow, chromium oxide, viridian, cobalt green, ultramarine blue, Prussian blue, cobalt blue, azo pigments, phthalocyanine pigments, quinacridone pigments, isoindolinone pigments, dioxazine pigments, threne pigments, perylene pigments, perynone pigments, thioindigo pigments, quinophthalone pigments, metal complex pigments, and other conventionally known pigments.

As the dyes, oil-soluble dyes are suitable for use in the oil-based ink, with examples including azo dyes, metal complex dyes, naphthol dyes, anthraquinone dyes, indigo dyes, carbonium dyes, quinoneimine dyes, xanthene dyes, cyanine dyes, quinoline dyes, nitro dyes, nitroso dyes, benzoquinone dyes, naphthoquinone dyes, phthalocyanine dyes and metallo-phthalocyanine dyes.

The pigments and dyes may be used individually, or they can be used in an appropriate combinations. It is desirable that they are contained in a proportion of from 0.01 to 5% by weight based on the total ink.

Such a coloring material as described above may be dispersed into the nonaqueous solvent as dispersed particles separately from the resin particles, or it may be incorporated into the resin particles dispersed in the nonaqueous solvent. In the latter case, the incorporation of a pigment is ordinarily effected by coating the pigment with the resin material of resin particles to form resin-coated particles, while the incorporation of a dye is ordinarily effected by coloring the surface portion of resin particles with the dye to form colored particles.

The average diameter of the resin particles, including colored particles, dispersed in the nonaqueous solvent is preferably from 0.05 to 5 μm, more preferably from 0.1 to 1.0 μm, yet more preferably from 0.1 to 0.5 μm. The diameter of the particle is determined with a particle size analyzer, CAPA-500 (trade name, manufactured by Horiba Ltd.).

The nonaqueous dispersion of resin particles used in the present invention can be prepared using a well-known mechanical grinding method or a polymerization granulation method. In the mechanical grinding method, the materials for forming resin particles are mixed, molten and kneaded, if needed, and directly ground into fine particles with a conventional grinder, and further dispersed in the presence of a dispersing polymer by means of a conventional wet-type dispersing machine (e.g., a ball mill, a paint shaker, a Keddy mill, a Dyno mill). In another mechanical grinding method, the materials for forming resin particles and a dispersion assisting polymer (a covering polymer) are kneaded in advance to form a kneaded matter, then ground into fine particles, and further dispersed in the presence of a dispersing polymer. Methods of preparing paints or liquid developers for electrostatic photography can be adopted in practice. Details of these methods are described, e.g., in *Flow of Paints and Dispersion of Pigments,* translated under the supervision of Kenji Ueki, Kyoritsu Shuppan (1971), Solomon, *Paint Science, Paint and Surface coating and Theory and Practice,* Yuji Harasaki, *Coating Engineering,* Asakura Shoten (1971), and Yuji Harasaki, *Elementary Course of Coating Science,* Maki Shoten (1977).

As the polymerization granulation method, well-known methods for dispersion polymerization in nonaqueous media can be employed. Details of such methods are described, e.g., in *The Newest Technology of Super-Fine Polymer Particles,* chapter 2, edited under the supervision of Soichi Muroi, CMC Shuppan (1991), *The Latest Systems for Electrophotographic Development, and Development and Application of Toner Materials,* chapter 3, edited by Koichi Nakamura, Nippon Kagaku Joho K.K. (1985), and K.B.J. Barrett, *Dispersion Polymerization in Organic Medium,* John Wiley (1975).

In order to stabilize the particles dispersed in the nonaqueous solvent, the particles are generally dispersed together with a dispersing polymer (also referred to as dispersion stabilizing resin hereinafter sometimes). The dispersing polymer contains repeating units soluble in the nonaqueous solvent as the main component, and weight average molecular weight (Mw) thereof is preferably from $1 \times 10^3$ to $1 \times 10^6$, more preferably from $5 \times 10^3$ to $5 \times 10^5$.

Suitable examples of the soluble repeating units of the dispersing polymer usable in the present invention include a polymerizing component represented by the following formula (I):

wherein $X_1$ represents —COO—, —OCO— or —O—; R represents an alkyl or alkenyl group having from 10 to 32 carbon atoms, preferably an alkyl or alkenyl group having from 10 to 22 carbon atoms, which may have a straight chain or branched structure and may be substituted, although the unsubstituted form is preferred (e.g., decyl, dodecyl, tridecyl, tetradecyl, hexadecyl, octadecyl, eicosanyl, docosanyl, decenyl, dodecenyl, tridecenyl, hexadecenyl, octadecenyl or linoleyl); and $a^1$ and $a^2$, which may be the same or different, each preferably represents a hydrogen atom, a halogen atom (e.g., chlorine or bromine), a cyano group, an alkyl group having from 1 to 3 carbon atoms (e.g., methyl, ethyl or propyl), —COO—$Z_1$ or —CH$_2$COO—$Z_1$ [wherein $Z_1$ represents a hydrocarbon group having not more than 22 carbon atoms which may be substituted (such as an alkyl, alkenyl, aralkyl, alicyclic or aryl group) including preferably an unsubstituted or substituted alkyl group having from 1 to 22 carbon atoms (e.g., methyl, ethyl, propyl, butyl, hexyl, heptyl, octyl, nonyl, decyl, dodecyl, tridecyl, tetradecyl, hexadecyl, octadecyl, eicosanyl, docosanyl, 2-chloroethyl, 2-bromoethyl, 2-cyanoethyl, 2-methoxycarbonylethyl, 2-methoxyethy or 3-bromopropyl), an unsubstituted or substituted alkenyl group having from 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, 4-methyl-2-hexenyl, decenyl, dodecenyl, tridecenyl, hexadecenyl, octadecenyl or linoleyl), an unsubstituted or substituted aralkyl group having from 7 to 12 carbon atoms (e.g., benzyl, phenetyl, 3-phenylpropyl, naphthylmethyl, 2-naphthylethyl, chlorobenzyl, bromobenzyl, methylbenzyl, ethylbenzyl, methoxybenzyl, dimethylbenzyl or dimethoxybenzyl), an unsubstituted or substituted alicyclic group having from 5 to 8 carbon atoms (e.g., cyclohexyl, 2-cyclohexylethyl or 2-cyclopentylethyl) and an unsubstituted or substituted aromatic group having from 6 to 12 carbon atoms (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl or dodecyloylamidophenyl)].

In addition to the repeating units represented by formula (I), the dispersing polymer may contain other repeating units as copolymerizing components. The copolymerizing components may be derived from any monomers as far as they can be copolymerized with the monomers corresponding to the repeating units of formula (I).

The suitable proportion of the repeating unit represented by formula (I) in the dispersing polymer is preferably at least 50% by weight, more preferably at least 60% by weight.

The suitable examples of the dispersing polymer include those described, e.g., in JP-A-10-204354, JP-A-10-204356, JP-A-10-259336, JP-A-10-306244, JP-A-10-316917, JP-A-10-316920 and JP-B-6-40229.

Specific examples of the dispersing polymer include Dispersion Stabilizing Resin (Q-1) used in Examples described hereinafter and commercially available products, e.g., Sorprene 1205 manufactured by Asahi Chemical Industry Co., Ltd.

In preparing the foregoing resin (P) particles in the state of an emulsion (latex), it is preferred that the dispersing polymer is added prior to the polymerization.

In the case of using a dispersing polymer, the proportion of the dispersing polymer to the resin (P) particle is from about 1 to about 50% by weight.

In the oil-based ink employed in the present invention, it is desirable that the dispersed resin particles and colored particles (the particles of coloring material) be electroscopic particles charged positively or negatively.

In order to impart the electroscopicity to those particles, the technology of a wet developer for electrostatic photography can be appropriately utilized. Specifically, the electroscopicity can be imparted to the particles by using electroscopic materials, for example, charge control agents and other additives as described, e.g., in *The Latest Systems for Electrophotographic Development, and Development and Application of Toner Materials,* pp. 139–148, described above, *The Fundamentals and Applications of Electrophotographic Techniques,* edited by Electrophotographic Society, pp. 497–505, Corona Co. (1988), and Yuji Harasaki, *Electrophotography,* vol. 16 (No.2), p. 44 (1977).

In addition, details of those materials are described, e.g., in British Patents 893,429 and 934,038, U.S. Pat. Nos. 3,900,412 and 4,606,989, JP-A-60-179751, JP-A-60-185963 and JP-A-2-13965.

The charge control agent as described above is preferably used in an amount of from 0.001 to 1.0 parts by weight per 1,000 parts by weight of dispersing medium as a carrier liquid. Furthermore, various kinds of additives can be added, but the total amount of additives has an upper limit because it is restricted by the electric resistance allowable for the oil-based ink used in the present invention. More specifically, when the ink has an electric resistance of lower than $10^9$ Ωcm in the condition that the dispersed particles are removed from the ink, the formation of a continuous gradation image having good quality may become difficult. Therefore, it is required that the amount of each additive added be controlled within the above described limitation.

According to the method of the present invention, a large number of prints having clear images can be obtained. Further, a printing plate is directly formed corresponding to digital image data in a printing press, and lithographic printing is performed at a low cost and a high speed.

The present invention will be described in greater detail with reference to the following examples, but the present invention should not be construed as being limited thereto.

Now, preparation example of resin particle (PL) suitable for the oil-based ink used in the present invention will be described below.

PREPARATION EXAMPLE 1

Preparation of Resin Particle (PL-1)

A mixed solution of 10 g of Dispersion Stabilizing Resin :Q-1) having the structure illustrated below, 100 g of vinyl acetate and 384 g of Isopar H was heated to a temperature of 70° C. under nitrogen gas stream with stirring. To the solution was added 0.8 g of 2,2'-azobis(isovaleronitrile) (abbreviated as A.I.V.N.) as a polymerization initiator, followed by reacting for 3 hours. Twenty minutes after the addition of the polymerization initiator, the reaction mixture became white turbid, and the reaction temperature rose to 88° C. Further, 0.5 g of the above-described polymerization initiator was added to the reaction mixture, and the reaction was carried out for 2 hours. Then, the temperature of the reaction mixture was raised to 100° C., and stirred for 2 hours to remove the unreacted vinyl acetate by distillation. After cooling, the reaction mixture was passed through a nylon cloth of 200-mesh to obtain a white dispersion. In the polymerization process, the polymerization rate was 90%. The white dispersion obtained was a latex of good monodispersity having an average particle diameter of 0.23 μm. The average particle diameter was measured by CAPA-500 (manufactured by Horiba Ltd.).

Dispersion Stabilizing Resin (O-1)

Mw: 5 × 10⁴

(composition ratio: by weight)

A part of the above-described white dispersion was centrifuged at a rotation of 1×10⁴ r.p.m. for 60 minutes and the thus-precipitated resin particles were collected and dried. The weight average molecular weight (Mw) of the resin particles was 2×10⁵ (a GPC value in terms of polystyrene) and a glass transition temperature (Tg) thereof was 38° C.

EXAMPLE 1

Oil-based ink was prepared in the following manner.
Oil-Based Ink (IK-1)

In a paint shaker (manufactured by Toyo Seiki K.K.), 10 g of copolymer of dodecyl methacrylate and acrylic acid (copolymerization ratio: 95/5 by weight), 10 g of nigrosine and 30 g of Shellsol 71 were placed together with glass beads, and the mixture was dispersed for 4 hours to prepare a fine dispersion of nigrosine.

A mixture of 45 g (as a solid basis) of Resin Particle (PL-1) prepared in Preparation Example 1, 20 g of the above described dispersion of nigrosine, 15 g of tetradecyl alcohol (FOC-1400 manufactured by Nissan Chemical Industries, Ltd.) and 0.08 g of copolymer of octadecene and maleic acid monooctadecylamide was diluted with one liter of Isopar G, thereby preparing oil-based black ink.

The oil-based ink (IK-1) was provided in an ink jet recording device of a lithographic printing press capable of forming lithographic printing plate s therein as described hereinbefore with reference to FIG. 1, FIG. 2 and FIG. 3. An aluminum plate having a thickness of 0.12 mm and being subjected to graining and anodizing treatment was affixed on a plate cylinder of the printing press as a printing plate precursor. Then, image data for printing were transmitted to an arithmetic and control unit of image data, and an ink ejection head was laterally moved to eject the oil-based ink while rotating the plate cylinder, whereby images of the oil-based ink were formed on the printing plate precursor.

A leading edge of an ejection electrode of the ink ejection head had a width of 10 $\mu$m and a distance between the ejection electrode and the plate cylinder (counter electrode) was 1.0 mm.

The oil-based ink images were strengthened with heating by means of a fixing device, thereby preparing a printing plate. Then, the ink jet recording device is moved to a position away from the plate cylinder in order to protect the ink ejection head, and printing operation was performed using printing paper in conventionally known lithographic printing method as described hereinbefore. Specifically, printing ink and dampening water were supplied onto the printing plate to form printing ink images, the printing ink images were transferred onto a blanket cylinder which was rotating together with the plate cylinder, and then the printing ink images on the blanket cylinder were transferred onto printing paper passing through between the blanket cylinder and an impression cylinder.

The print after printing 10,000 sheets had very clear images without the occurrence of disappearance or sharpening of image.

EXAMPLE 2

The same procedure as in Example 1 was carried out except for using, as a printing plate precursor, a paper plate comprising a water-resistant support having provided thereon a hydrophilic image-receiving layer shown below in place of the aluminum plate employed in Example 1.

On a paper support comprising wood free paper having a basis weight of 100 g/m$^2$, as a substrate, having provided thereon a water-resistant layer containing kaolin, polyvinyl alcohol, an SBR latex and a melamine resin as the main component was coated Dispersion A shown below in a dry coverage of 6 g/m$^2$ to form an image-receiving layer, whereby the printing plate precursor was prepared.

Dispersion A

A mixture of 3 g of gelatin (first-class, manufactured by Wako Pure Chemical Industries Ltd.), 20 g of a 20)% aqueous solution of colloidal silica (Snowtex C manufactured by Nissan Chemical Industyries, Ltd.), 7 g of silica gel (Silysia #310 manufactured by Fuji Silysia Chemical Co., Ltd.), 0.4 g of paraformaldehyde, as a hardening agent and 100 g of distilled water was dispersed in a paint shaker together with glass beads for 10 minutes, followed by removing the glass beads.

The print after printing 3,000 sheets had very clear images without the occurrence of disappearance or sharpening of image. It was found, however, that the printing plate having the standard size of A3 extended lengthwise 0.1 mm.

EXAMPLE 3

The same procedure as in Example 1 was carried out except that as a printing plate precursor, a plate comprising a water-resistant support having provided thereon an image-receiving layer capable of being rendered hydrophilic upon an oil-desensitizing treatment shown below was used in place of the aluminum plate employed in Example 1 and that after the image formation, the non-image areas were rendered hydrophilic by means of a plate surface oil-desensitizing device, provided with an oil-desensitizing solution containing a cyan compound.

On a water-resistant paper support comprising wood free paper having a basis weight of 100 g/m$^2$, as a substrate, having provided on the both side thereof polyethylene laminated layers each having a thickness of 20 $\mu$m was coated Dispersion B shown below in a dry coverage of 15 g/m$^2$ to form an image-receiving layer, whereby the printing plate precursor was prepared.

Dispersion B

A mixture of 100 g of dry type zinc oxide, 3 g of Binder Resin (B-1) shown below, 17 g of Binder Resin (B-2) shown below, 0.15 g of benzoic acid and 155 g of toluene was dispersed using a wet-type dispersing machine (Homogenizer manufactured by Nippon Seiki K.K.) at a rotation of 6,000 r.p.m. for 8 minutes.

The print after printing 5,000 sheets had very clear images without the occurrence of disappearance or sharpening of image.

While the invention has been described in detail and with reference to specific embodiments thereof, it will be apparent to one skilled in the art that various changes and modifications can be made therein without departing from the spirit and scope thereof.

What is claimed is:

1. A method of lithographic printing comprising forming an image based on signals of image data directly on a printing plate precursor mounted on a plate cylinder, of a printing press, thereby preparing a printing plate, and conducting lithographic printing, wherein the formation of the image on the printing plate precursor is carried out by an ink jet recording method in which oil-based ink is ejected utilizing an electrostatic field, wherein the oil-based ink is a dispersion comprising hydrophobic resin particles which are solid in the temperature range from 15° to 35° C. dispersed in a nonaqueous solvent having an electric resistance of $10^9$ Ωcm or more and a dielectric constant of 3.5 or below, the hydrophobic resin particles are stabilized in the non-aqueous solvent by means of a dispersing polymer and the dispersing polymer comprises a repeating unit which is soluble in the nonaqueous solvent and represented by the following formula (I):

wherein $X_1$ represents —COO—, —OCO— or —O—; R represents an alkyl or alkenyl group having from 10 to 32 carbon atoms; and $a^1$ and $a^2$, which may be the same or different, each represents a hydrogen atom, a halogen atom, a cyano group, an alkyl group having from 1 to 3 carbon atoms, —COO—$Z_1$ or —CH$_2$COO—$Z_1$ wherein $Z_1$ represents a hydrogen atom or a hydrocarbon group having not more than 22 carbon atoms.

2. The method of lithographic printing as claimed in claim 1, wherein the printing plate precursor comprises a water-resistant support having provided thereon an image-receiving layer.

3. The method of lithographic printing as claimed in claim 2, wherein the image-receiving layer is a hydrophilic layer comprising an inorganic pigment and a binder.

4. The method of lithographic printing as claimed in claim 2, wherein the image-receiving layer is a layer capable of being rendered hydrophilic upon an oil-desensitizing treatment.

5. The method of lithographic printing as claimed in claim 1, wherein the hydrophobic resin particles are electroscopic particles positively or negatively charged.

6. The method of lithographic printing as claimed in claim 1, wherein the hydrophobic resin particles are composed of a resin having a glass transition temperature of from −5° C. to 110° C. or a softening temperature of from 33° C. to 140° C.

7. The method of lithographic printing as claimed in claim 1, wherein an amount of the hydrophobic resin particles is from 0.5 to 20% by weight based on the total amount of the oil-based ink.

8. The method of lithographic printing as claimed in claim 1, wherein the oil based-ink further comprises a coloring material.

9. The method of lithographic printing as claimed in claim 8, wherein the coloring material is dispersed in the non-aqueous solvent as dispersed particles separately from the hydrophobic resin particles.

10. The method of lithographic printing as claimed in claim 8, wherein the coloring material is incorporated into the hydrophobic resin particles.

11. The method of lithographic printing as claimed in claim 1, wherein the hydrophobic resin particles are those prepared by a polymerization granulation method.

* * * * *